(12) United States Patent  (10) Patent No.: US 7,847,978 B2
Hiromatsu  (45) Date of Patent: Dec. 7, 2010

(54) IMAGE READING APPARATUS AND IMAGE READING METHOD

(75) Inventor: Kenji Hiromatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/108,617

(22) Filed: Apr. 24, 2008

(65) Prior Publication Data

US 2008/0204782 A1    Aug. 28, 2008

Related U.S. Application Data

(62) Division of application No. 10/267,643, filed on Oct. 10, 2002, now Pat. No. 7,391,533.

(30) Foreign Application Priority Data

Oct. 17, 2001  (JP)  ............................. 2001-319279

(51) Int. Cl.
  *H04N 1/40* (2006.01)
(52) U.S. Cl. .................... 358/2.1; 358/529; 348/243
(58) Field of Classification Search .................. 358/1.9, 358/2.1, 529; 348/243, 96–112
  See application file for complete search history.

(56) References Cited

U.S. PATENT DOCUMENTS 5,272,536 A   12/1993   Sudo et al. .................. 348/243
6,160,578 A   12/2000   Carroll et al. ............. 348/222.1
7,064,871 B2   6/2006   Yamagata et al. ........... 358/474

FOREIGN PATENT DOCUMENTS

JP         6-164938       6/1994
JP         2001-28666     1/2001

OTHER PUBLICATIONS

Japanese Official Communication dated Aug. 7, 2007, regarding Application No. 2002-292409.
"TC255P 336×244 Pixel CCD Image Sensor", Texas Instruments, Jun. 1996.

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

An image reading apparatus is provided which includes a contact image sensor comprised of a plurality of sensor chips arranged in series, an analog image processor for processing an analog image signal from the contact image sensor, a unit for conducting black shading correction for each pixel and a unit for conducting white shading correction for each pixel. The image reading apparatus further includes a unit for digitally monitoring a black offset value corresponding to each chip with respect to the signal that has been processed by the analog image processor and a unit for adding and subtracting a black offset variation amount for each chip in the previous stage of the unit for conducting black shading correction for each pixel, and corrects black offset based on an instruction of a control unit.

10 Claims, 14 Drawing Sheets

IMAGE READING APPARATUS AND IMAGE READING METHOD

RELATED APPLICATIONS

This application is a division of U.S. patent application Ser. No. 10/267,643, filed Oct. 10, 2002, which is incorporated by reference herein in its entirety, as if fully set forth herein, and claims the benefit of priority under 35 U.S.C. §119, based on Japanese Patent Application No. 2001-319279, filed Oct. 17, 2001, which is incorporated by reference herein in its entirety, as if fully set forth herein.

BACKGROUND OF THE INVENTION

1. Field of the Invention

The present invention relates to an image reading apparatus having a plurality of channels and an image reading method.

2. Related Background Art

Along with the recent progress of a semiconductor process and of production technology, a contact image sensor (CIS) is used in a scanner for consumers because of its characteristics that the cost is inexpensive and it requires only a smaller amount of light from a light source and other characteristics.

A scanner for consumers in recent years has a main scanning period of about 10 to 20 ms while an image reading apparatus, what is called, a copying machine has a main scanning period of about 300 μs, which is two orders of magnitude faster than the scanner.

Here, as one of the problems that arise in the case where the CIS is used in the image reading apparatus with a higher speed by two orders of magnitude, there is variation of a black offset level (which is a signal level for correcting an input signal level to a reference level of a black signal by calculation, and with this signal level, offset of the signal level difference between input signals can be attained) due to a temperature rise of a sensor chip. Specifically, in a continuous original reading mode capable of reading up to approximately 50 sheets with the use of an auto document feeder (ADF), there is conducted only once at the beginning of a job (for example, an image reading operation based on an operator's instruction or the like) shading correction in which the level difference between effective image signals (for example, the level difference between image signals in a line sensor at the time when a uniform density reference plate is read) is offset. This is because copying productivity falls when the shading correction is conducted for each original. Further, for example, in response to the recent increasing request for lower power consumption, there may be a case where power is not supplied to the CIS when scanning is not performed, but power is supplied immediately before scanning is performed, and then, several tens of originals are continuously copied.

In this case, a temperature of a sensor chip or an analog processor rapidly rises from a cool state for about the first minute, and then, rises gradually. As a result, the black offset level varies. Further, in the case where, for example, an Xe lamp is used as an original illumination light source, the lamp is also a heat generating source besides self-heating of the sensor chip or analog processor. Thus, variation is emphasized.

In the prior art described above, the following problem arises. That is, for example, in the case where it takes three minutes from the beginning of reading the first original to the end of reading the fiftieth original in the continuous reading of 50 originals placed on the ADF, the black offset level greatly changes between the time of reading the first original and the time of reading the fiftieth original.

This is more serious in the case of using a so-called multichip sensor in which a plurality of sensor chips are arranged. That is, due to the individual difference between the sensor chips, a variation amount of the black offset level is nonuniform among the plurality of chips. Therefore, the reference level of the black signal differs among a plurality of channels, and the difference in luminance level is caused between image regions corresponding to the respective channels, which leads to remarkable deterioration of image quality.

SUMMARY OF THE INVENTION

The present invention has been made in consideration of the above situation, and has an object to suppress degradation of quality in reading an image.

An image reading apparatus according to the present invention includes:

an imaging unit including a plurality of channels, arranged to output on a each channel basis an effective signal output from a light receiving portion that is capable of receiving light from an object, and an OB signal output from a light shielding portion that shields light from the object; and a sorting unit arranged to sort the effective signals and OB signals each of which are output on the each channel basis.

Other features and advantages of the present invention will be apparent from the following description taken in conjunction with the accompanying drawing, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DESCRIPTION OF THE PREFERRED EMBODIMENTS

Preferred embodiments of the present invention will be described in detail in accordance with the accompanying drawings.

First Embodiment

Figure 1:
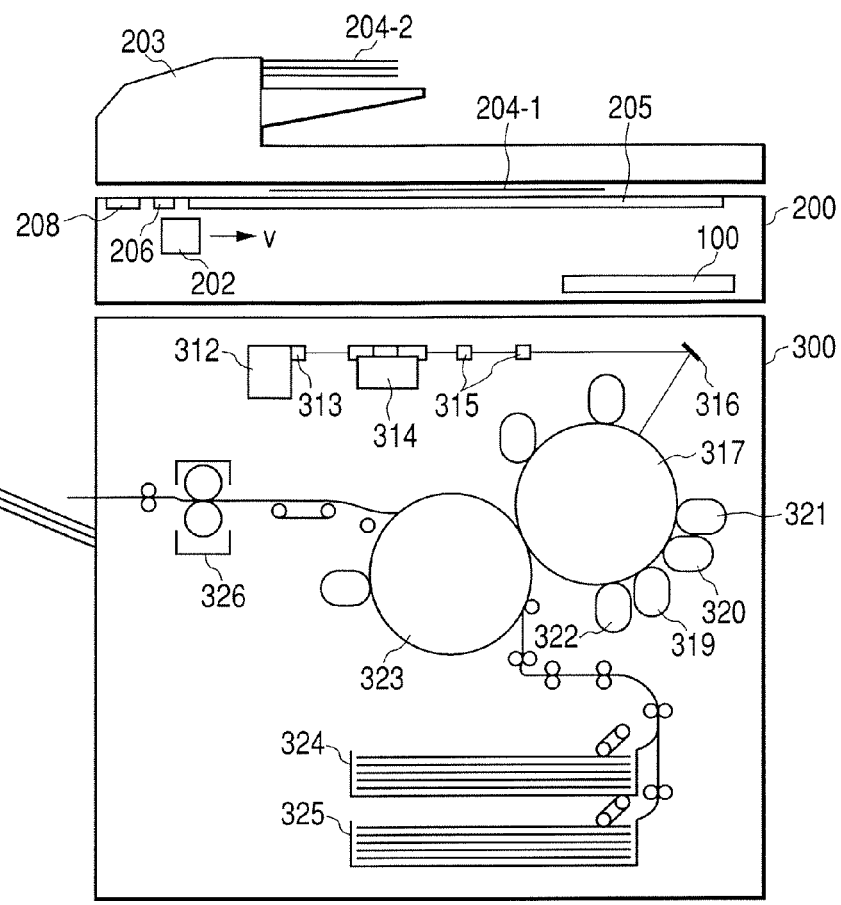
FIG. 1 is a diagram showing a structure of a copying machine in accordance with an embodiment of the present invention.

FIG. 1 is a diagram showing a sectional structure of an image reading apparatus in accordance with an embodiment of the present invention. In the figure, an image scanner unit 200 reads an original as an object, and performs digital signal processing. Further, a printer unit 300 prints out in full color an image corresponding to the image of the original read by the image scanner unit 200 on a sheet.

A CIS module 202 used in this embodiment will be described with reference to FIG. 2.

Figure 2:
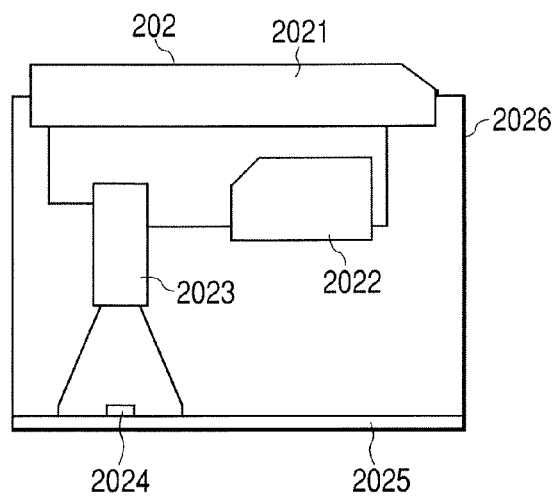
FIG. 2 is a sectional view of a CIS in accordance with the embodiment of the present invention.
Figure 3:
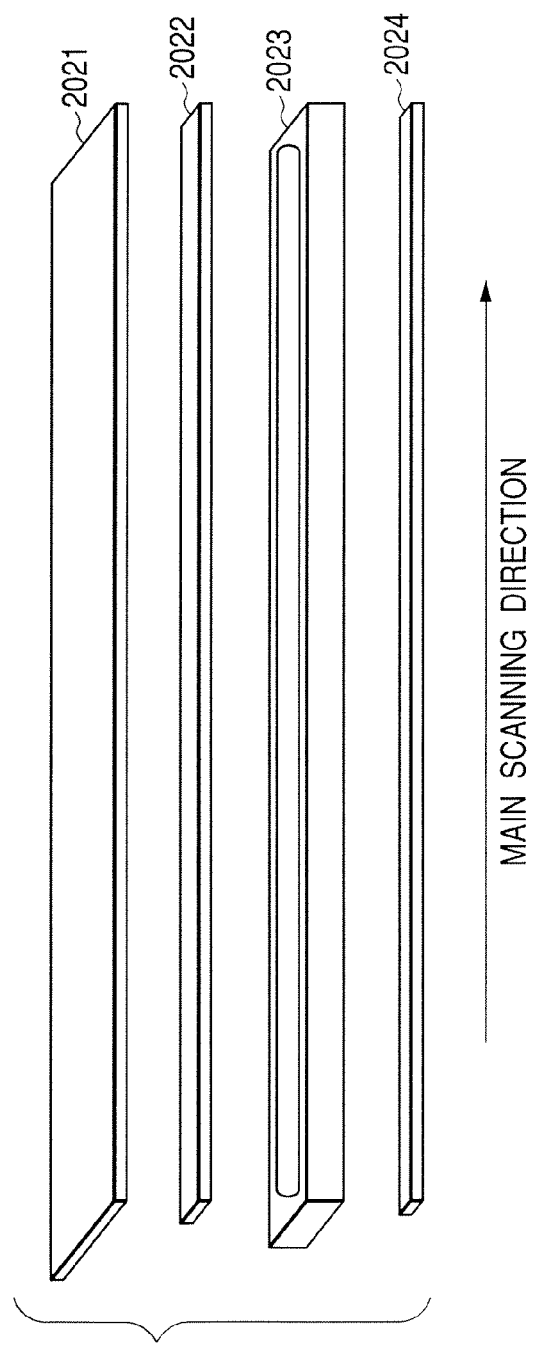
FIG. 3 is a diagram showing a structure of the CIS in accordance with the embodiment of the present invention.

FIG. 2 is a sectional view taken along a main scanning direction of the CIS module 202 which corresponds to the longitudinal direction. As shown in this figure, the CIS module 202 is structured as follows. That is, a cover glass 2021, an illumination light source 2022 comprised of an LED (light emitting diode), a magnification imaging lens 2023 comprised of a SELFOC lens or the like, and a color line sensor 2024 are mounted onto a substrate 2025, and these are attached to a mold 2026, thereby structuring the CIS module 202 as an integral body. Further, FIG. 3 is a perspective view of the structure of FIG. 2.

Figure 4:
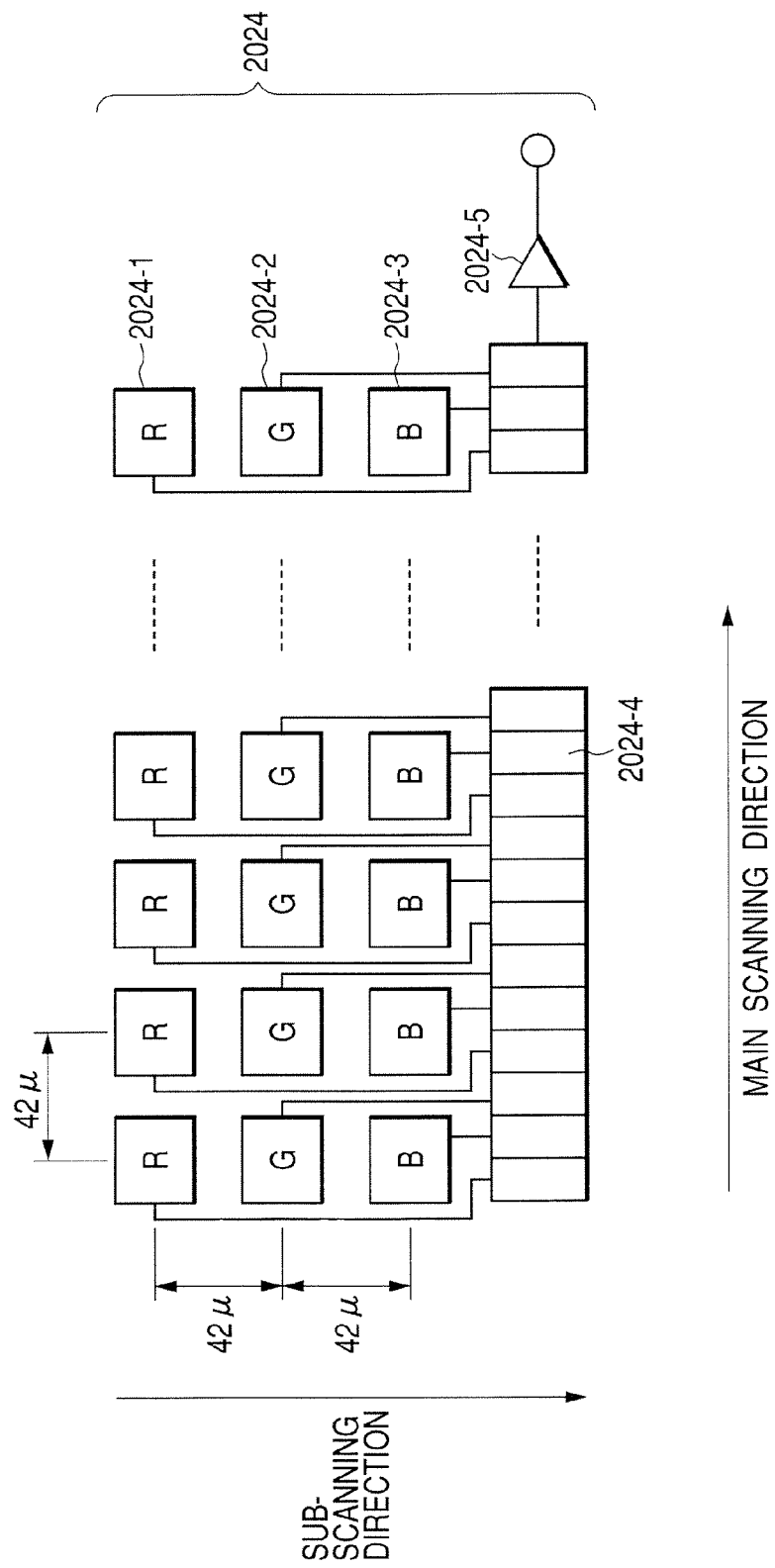
FIG. 4 is a diagram showing a microscopic structure of the CIS in accordance with the embodiment of the present invention.

FIG. 4 is an enlarged diagram of a microscopic portion of the color line sensor 2024 in the CIS module 202. In this figure, reference numeral 2024-1 denotes a light receiving element array (photosensor) for reading red light (R), and reference numerals 2024-2 and 2024-3 denote light receiving element arrays for reading wavelength components of green light (G) and blue light (B), respectively. Therefore, an R filter for transmitting a wavelength component of red color in visible light is arranged on the R-color photosensor 2024-1. Similarly, a G filter and a B filter are arranged on the G-color photosensor 2024-2 and the B-color photosensor 2024-3, respectively.

Here, each rectangle of R, G or B indicates a reading pixel of an effective region for outputting an effective pixel signal by reception of light in a light receiving portion as a light receiving means. There is shown a CIS module for magnification reading of 600 dpi (dots per inch), and thus, the size of one pixel is 42×42 $\mu m^2$.

Further, the three light receiving element arrays having different optical characteristics take a monolithic structure on the same silicon chip so as to be arranged parallel with each other in order that the respective sensors of R, G and B read the same line of the original. This structure comprises the pixels 2024-1, 2024-2 and 2024-3 of a reading opening portion which are comprised of photodiodes formed with the filters of the three primary colors of R, G and B. The respective three reading lines of R, G and B are arranged at intervals of 42 $\mu m$ in a sub-scanning direction. The pixel pitch in a main scanning direction is also 42 $\mu m$. The electric charge corresponding to an amount of incident light is generated by the photodiode photosensors of the opening portion during an accumulation time.

A transfer of an electric charge in a charge transfer unit 2024-4 is as follows. That is, a shift pulse is applied at the timing of a leading end of one line, whereby the electric charge is moved from the opening portion pixels 2024-1, 2024-2 and 2024-3 to the charge transfer unit 2024-4. Further, the electric charge moved to the charge transfer unit 2024-4 is transferred to an output amplifier unit 2024-5 in a time-division manner in the order of GBRGBR . . . (that is, in such an order that the signals accumulated in the opening portion pixels 2024-1, 2024-2 and 2024-3 are alternated with each other) at the timing of reception of a transfer clock. The electric charge is converted into a voltage in the output amplifier unit 2024-5, and then, signals are output as voltage output in the order of GBRGBR . . . . Further, there is formed for each chip a so-called optical black (OB) portion which is a light-shielded pixel (not-shown) and outputs a reference signal for offset described later.

Figure 5:
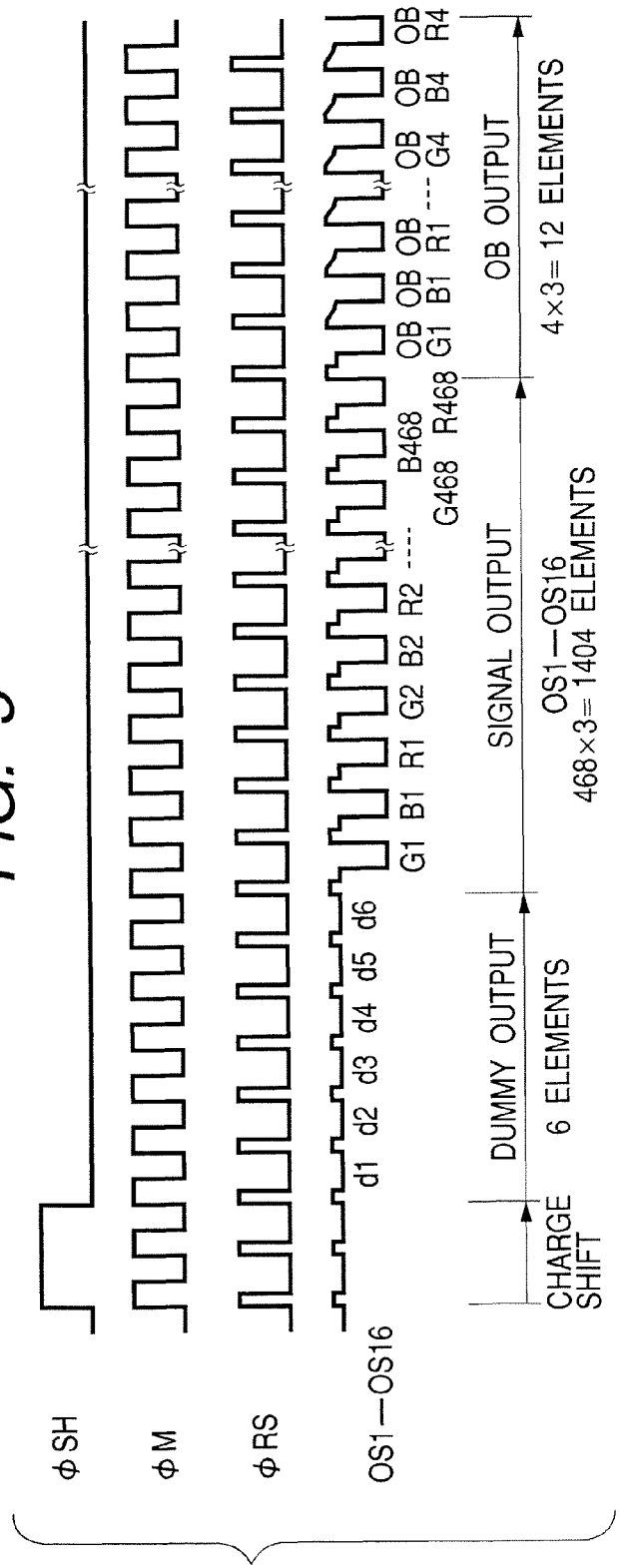
FIG. 5 is a diagram showing an operation of reading signals from the CIS module in accordance with the embodiment of the present invention.

FIG. 5 shows output signals OS 1 to OS 16 from the CIS module 202 having the above-described color line sensor 2024.

Figure 6:
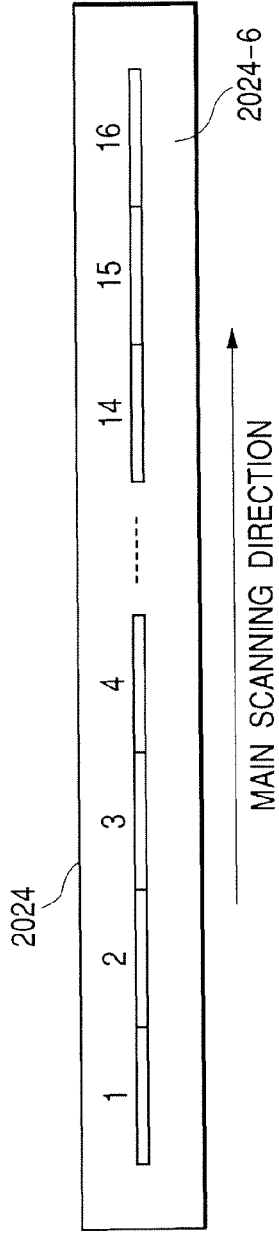
FIG. 6 is a diagram showing a macroscopic structure of the CIS in accordance with the embodiment of the present invention.

FIG. 6 is a macroscopic diagram of the color line sensor 2024 in FIG. 4. The color line sensor 2024 is formed such that 16 CCD chips as sensor chips are linearly mounted on a substrate 2024-6. Since signals are output from the respective chips, the signals of 16 channels corresponding to the respective chips are output simultaneously or sequentially. Each of the chips has the OB portion as described above. In this embodiment, the channels are provided for the respective chips. Therefore, OB signals and effective pixel signals can be separately output from the respective 16 channels based on the channel basis.

The signals of 16 channels are subjected to gain and offset control in an analog signal processing unit 101, and then are converted into digital signals in an A/D converter basis.

Here, in the image scanner unit 200, as shown in FIG. 1, an original 204-1 placed on an original table glass (platen) 205 by an original pressure plate of an ADF 203 is irradiated with light from the illumination light source 2022 arranged in the CIS module 202 shown in FIG. 2. The reflected light from the original 204-1 is imaged on the color line sensor 2024 through the lens 2023.

The CIS 202 is moved to the position of a continuous-supply glass 208, whereby originals can be successively supplied from the ADF 203 to be read.

The color line sensor 2024 conducts color separation on light information from an original, reads red (R), green (G) and blue (B) components in full-color information, and then, transfers the components to a signal processing unit 100. Each of the line sensor arrays of the color line sensor 2024 for reading the signal corresponding to each of the color components comprises 7500 pixels. Thus, the color line sensor 2024 reads an A-3 original which is 297 mm in the short length direction, that is, an original with the maximum size that can be placed on the original table glass 205, at a resolution of 600 dpi.

Note that the CIS module 202 mechanically moves at a speed V in a direction (hereinafter referred to as sub-scanning direction) perpendicular to the electric scanning direction (hereinafter, referred to as main scanning direction), thereby scanning the entire surface of the original 204-1.

Correction data of the read data in the R, G and B sensors 2024-1 to 2024-3 formed in the color line sensor is obtained by reading the reflected light from a standard white plate 206 as a density standard. The standard white plate 206 shows a substantially uniform reflection characteristic with visible light, and has a white color for visible light. In this embodiment, correction of the output data from the R, G and B sensors 2024-1 to 2024-3 is performed using the standard white plate 206.

Further, in the image signal processing unit 100, the read signals are electrically processed to be separated into respective components of magenta (M), cyan (C), yellow (Y) and black (Bk), and the components are transferred to the printer unit 300. Further, in this embodiment, one component among the respective components of M, C, Y and Bk is transferred to the printer unit 300 for each original scanning in an image scanner unit 200, thereby completing a printout of a copy.

In the printer unit 300, respective image signals of M, C, Y and Bk from the image scanner unit 200 are sent to a laser driver 312. The laser driver 312 drives a semiconductor laser 313 with modulation in accordance with the image signal. Then, laser light scans a surface of a photosensitive drum 317 through a polygon mirror 314, an f-θ lens 315 and a mirror 316.

A developing device is composed of a magenta developing device 319, a cyan developing device 320, a yellow developing device 321 and a black developing device 322, and these four developing devices are alternately made in contact with the photosensitive drum 317 to develop electrostatic latent images of M, C, Y and Bk formed on the photosensitive drum 317 with the corresponding toners. Further, a transfer drum 323 is wound around with a sheet supplied from a sheet cassette 324 or a sheet cassette 325, and the toner images developed on the photosensitive drum 317 are transferred to the sheet.

In this way, the toner images of M, C, Y and Bk are sequentially transferred onto the sheet. Thereafter, the sheet passes through a fixing unit 326 to be discharged.

Next, the image signal processing unit 100 will be described.

Figure 7:
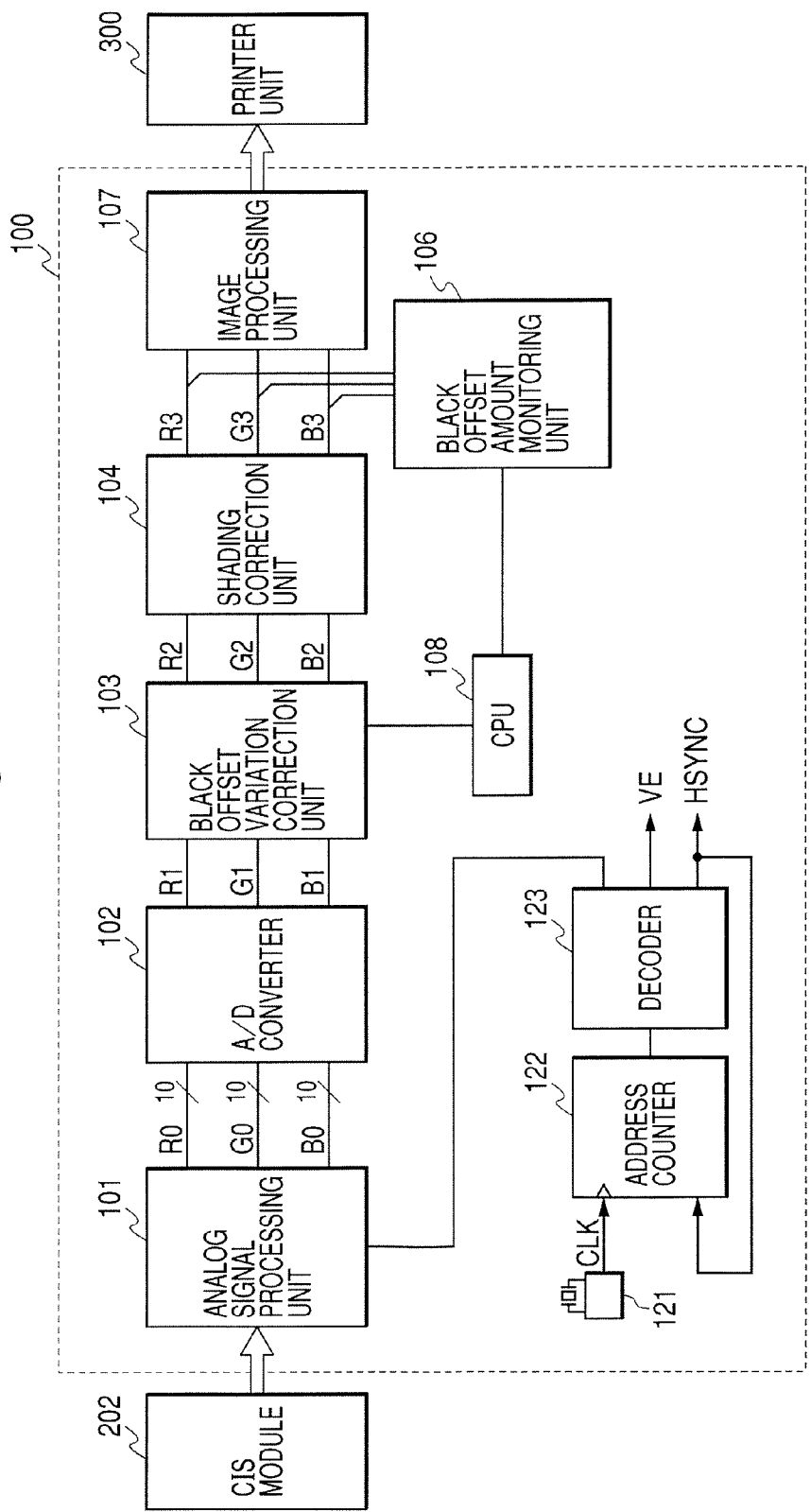
FIG. 7 is a diagram showing an image processing unit 100 in accordance with the embodiment of the present invention.
Figure 11:
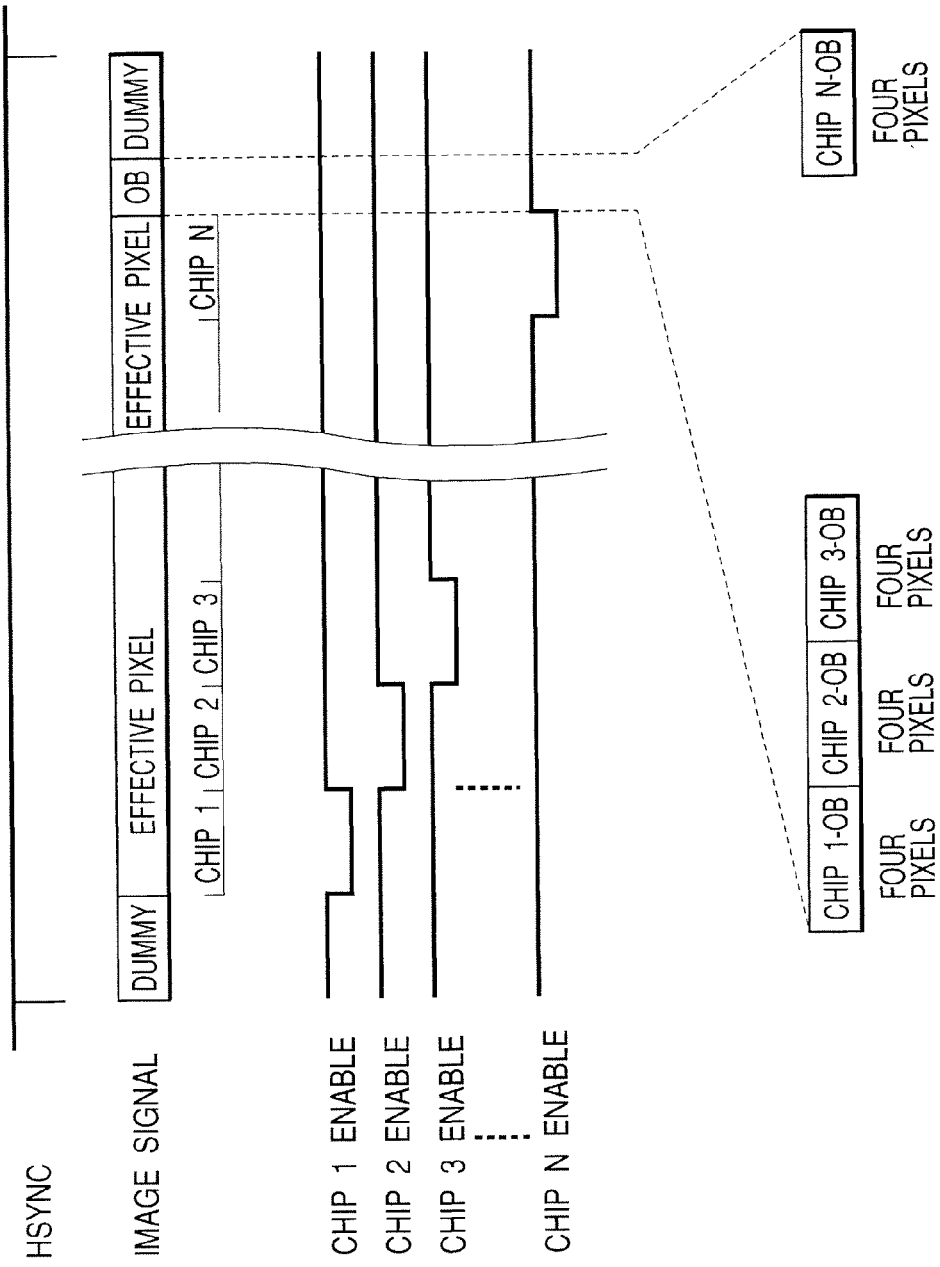
FIG. 11 is a diagram for explaining a timing chart in accordance with the embodiment of the present invention.

FIG. 7 is a block diagram showing a flow of image signals in the image signal processing unit 100 in the image scanner unit 200 in accordance with this embodiment. Respective blocks are controlled by a CPU (central processing unit) 108 as a controller. Specifically, as shown in this figure, the image signals output from the CIS module 202 are input to the analog signal processing unit 101, and are subjected to gain control and offset control (offset of the signal level difference between analog signals by a clamp circuit or the like) there. Then, the image signals are converted into respective 10-bit digital image signals R1, G1 and B1 in accordance with the color by the A/D converter 102. At this time, the signals output from the CIS module (signals accumulated in the opening portion pixels 2024-1, 2024-2 and 2024-3 and output therefrom in alternate order as described above with FIG. 4) are sorted to obtain the respective outputs of R, G and B by a function of a sorting unit in the analog signal processing unit 101, and the outputs are input to the A/D converter 102. By the sorting, the image signals R1, G1 and B1 are generated as shown in FIG. 11 described later.

Figure 8:
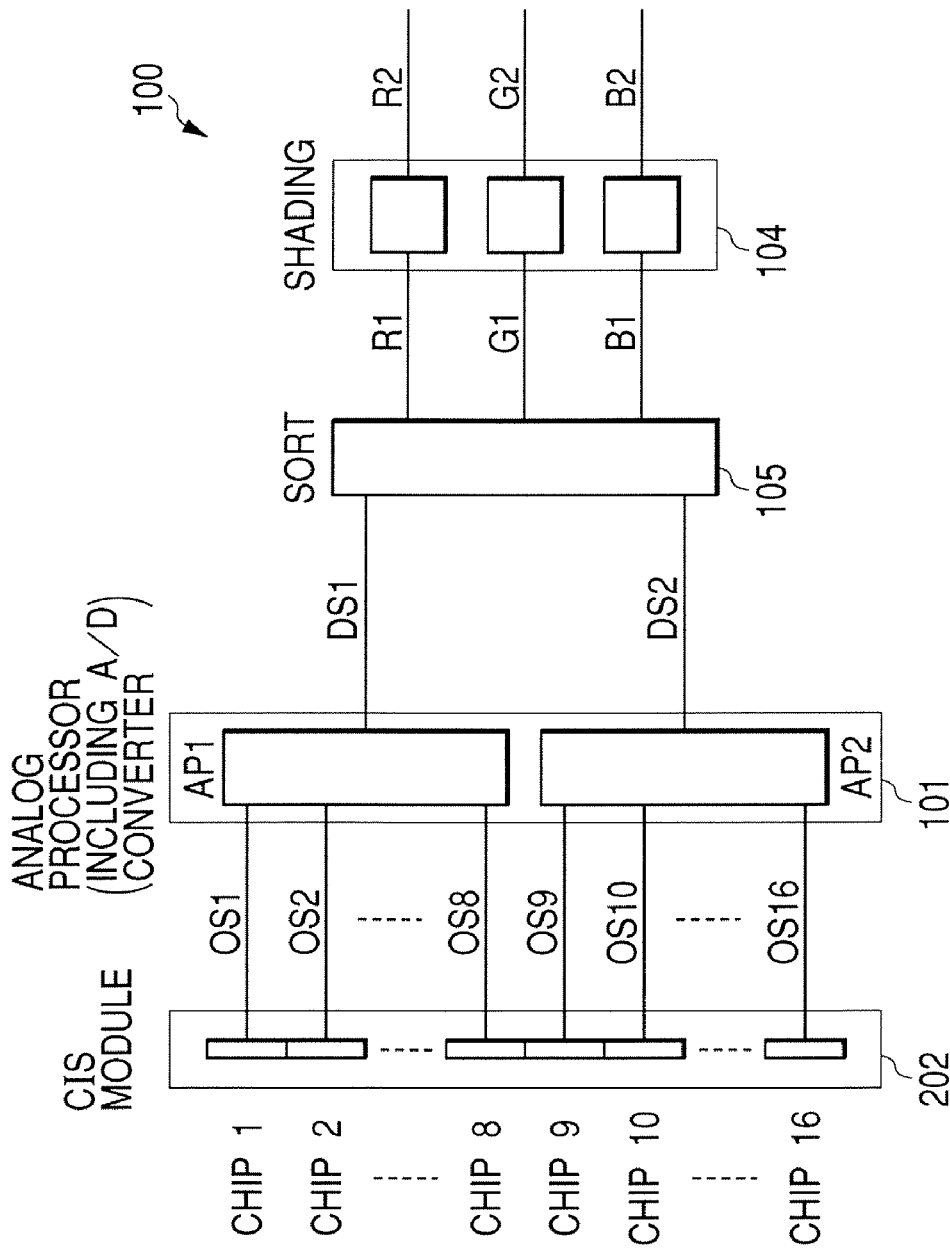
FIG. 8 is a diagram showing a structure of sorting of signals in accordance with the embodiment of the present invention.

Note that the structure of sorting of signals is shown in FIG. 8. That is, the signals OS 1 to OS 16 of Chip 1 to Chip 16 which are output from the CIS module 202 are input to the analog signal processing unit 101, and then are converted into the digital signals by the A/D converter 102. Then, the image signals R1, G1 and B1 as shown in FIG. 11 described later are generated by the sorting unit 105. R0, G0 and B0 and R1, G1 and B1 differ from each other in that the former are analog signals and the latter are digital signals, respectively.

The image signals R1, G1 and B1 are then input to a shading correction unit 104 to be subjected to shading correction which uses the effective signals obtained in reading the standard white plate 206 for each color. A clock generation unit 121 generates a clock on a pixel basis. Further, a main scanning address counter 122 counts the clocks from the clock generation unit 121 to generate a pixel address output of one line. Then, a decoder 123 decodes the main scanning address from the main scanning address counter 122 to generate sensor drive signals per line such as a shift pulse and a reset pulse, a VE signal indicating an effective signal region in the reading signal of reading one line from the color image sensor, and a line synchronizing signal HSYNC. Note that the main scanning address counter 122 is cleared in accordance with the line synchronizing signal HSYNC, and starts to count the main scanning address of the next line.

Figure 9:
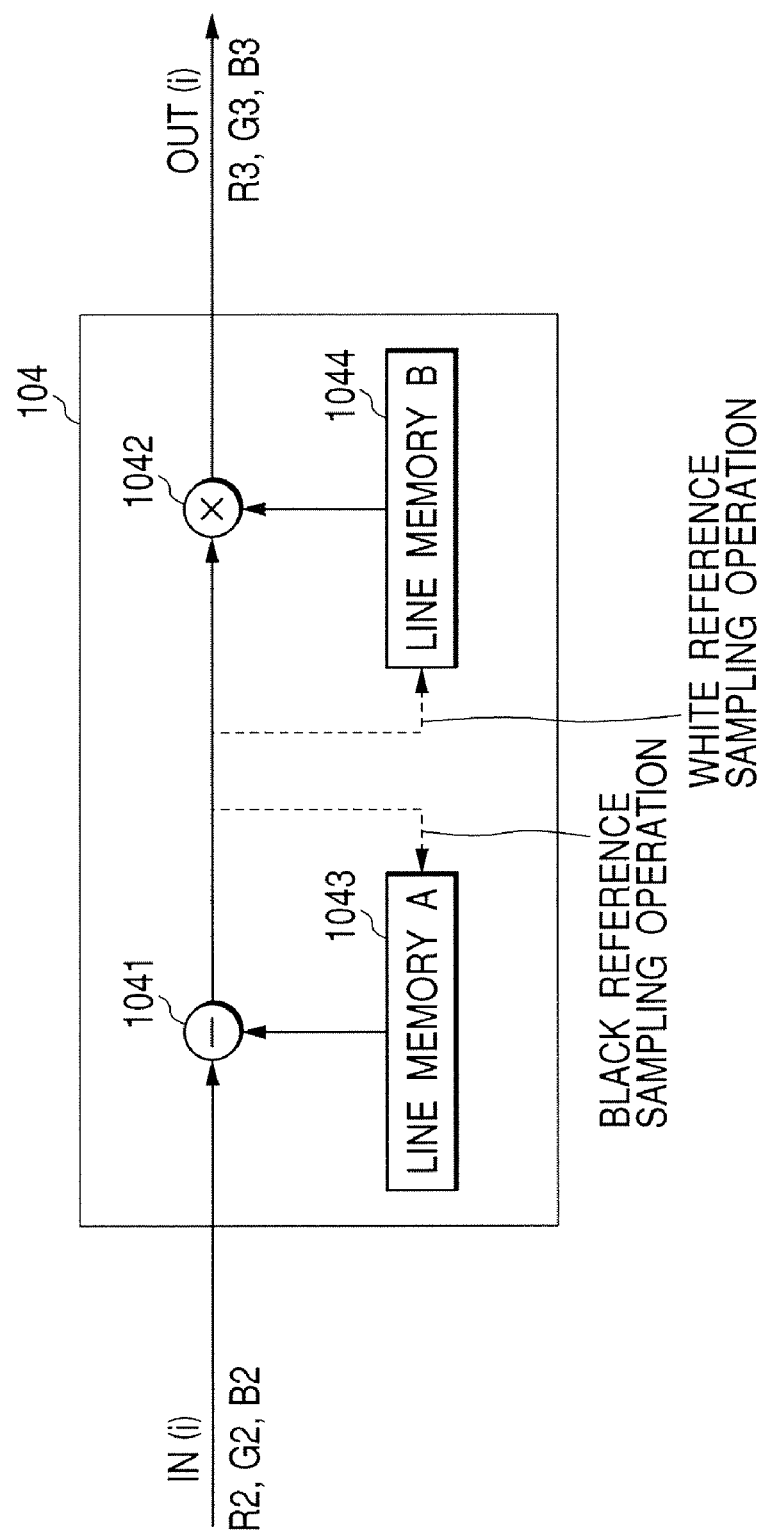
FIG. 9 is a diagram showing a shading correction unit 104 in accordance with the embodiment of the present invention.
Figure 10:
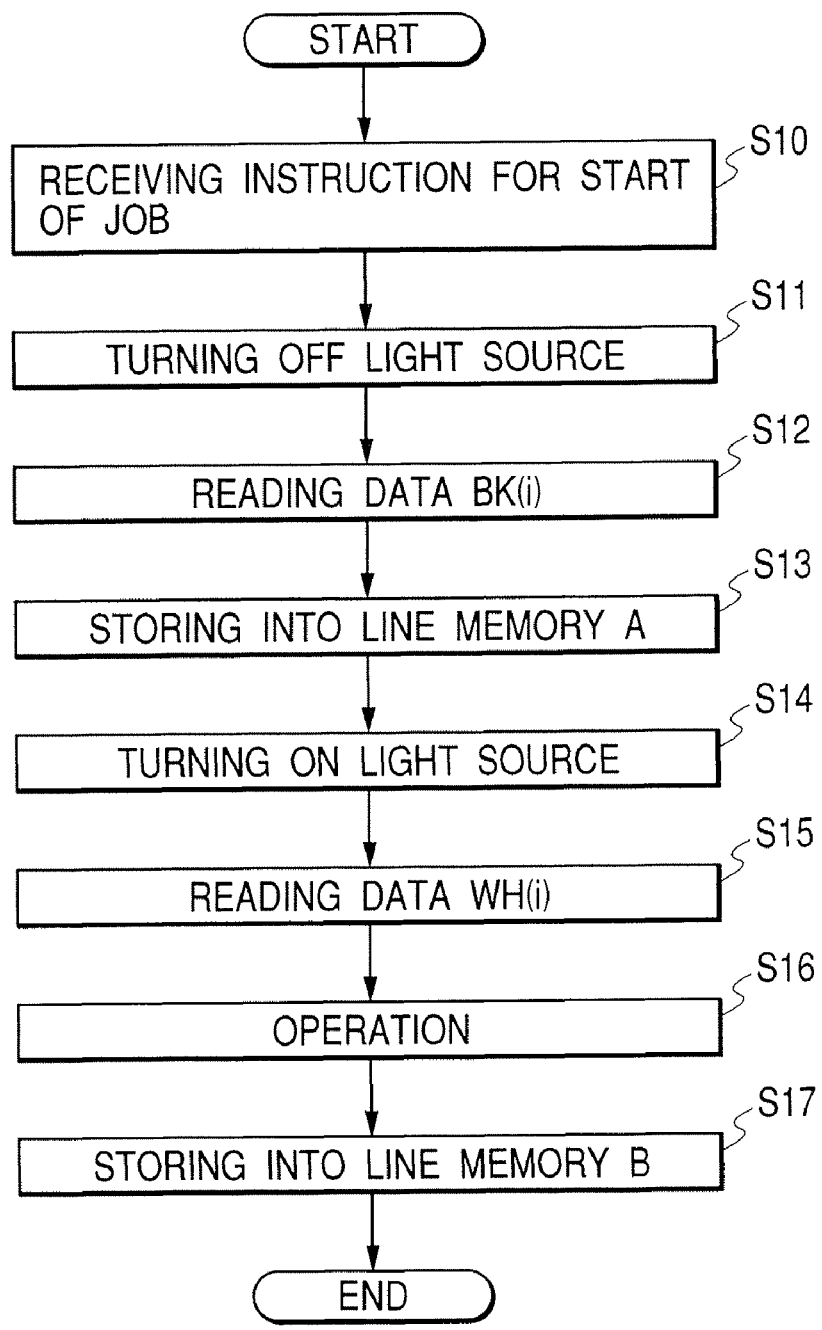
FIG. 10 is a flowchart of a shading correction operation in accordance with the embodiment of the present invention.

FIG. 9 is a diagram for explaining the shading correction unit 104 for offsetting the level difference between the effective image signals (for example, the level difference between the image signals in the line at the time when the uniform density reference plate is read). FIG. 4 shows only one of RGB for simplicity. Further, FIG. 10 is a diagram showing an operational flow of the shading correction unit 104. The operational flow is controlled by the CPU 108 as the controller.

In a data sampling operation for conducting the shading correction in this embodiment, in the case where the CPU 108 gives an instruction for a job of reading an image (step S10), it turns off a light source (step S11) first. After the light source is turned off, in the state in which light is prevented from entering the photosensors 2024-1 to 2024-3 in the opening portion, a signal Bk (i) as a black standard (black offset level) is read out for each pixel (step S12), and the signal Bk (i) is stored into a line memory A 1043 for each pixel (step S13). The stored signal Bk (i) has the signal level for correcting the input signal level to the reference level as a black signal by conducting an operation.

Next, the light source is turned on at the position of the white reference plate as the density reference plate (step S14). In the state in which the light source is turned on, a signal WH (i) as a white standard is read out for each pixel (step S15).

An operation for conversion to white shading correction data is conducted to the signal WH (i) (equation 1) (step S16), and the result is stored into a line memory B 1044 (step S17). Note that the line memory A 1043 and the line memory B 1044 may be formed as separate storage media as in this embodiment, or may be formed as the same storage medium.

$$1/(WH(i)-Bk(i)) \quad \text{(equation 1)}$$

In the actual image reading, by using the data stored in the line memory A and the line memory B, the operation based on an equation 2 is conducted in real time for each effective pixel signal input from the CIS module 202. The resultant is output as data after the shading correction.

$$OUT(i)=(IN(i)-Bk(i))\times 1/(WH(i)-Bk(i)) \quad \text{(equation 2)}$$

Here, a signal IN (i) is an input signal of the i-th pixel, a signal OUT (i) is an output signal of the i-th pixel, and a signal Bk (i) is a black standard (black offset level) of the i-th pixel of the line memory A. As described above, $1/(WH(i)-Bk(i))$ is white shading correction data of the i-th pixel of the line memory B.

Note that the reason that the signal Bk (i) is stored into the line memory A 1043 on each pixel basis as described above is as follows. That is, in general, compared with a reduction optical system, the CIS has characteristics that: (1) a pixel is large, and thus, a black noise is also large; and (2) since the offset value differs among plural chips, the offset level needs to be corrected for each pixel, and therefore, there is needed a memory enough to store the correction value for each pixel. On the other hand, if a CCD in the reduction optical system does not have the reasons (1) and (2), in black shading, the correction value is not stored for each pixel, but the correction value for offset correction per sensor (per ODD and EVEN in the case where the pixels of one line of a sensor are output as ODDs and EVENs) is stored, and shading is generally performed by using the correction value.

FIG. 11 is a timing chart of one signal among RGB signals which are obtained by sorting the signals output from the CIS module 202.

As described above with FIG. 5, as to the signal output from the CIS module, which is the image signal corresponding to the line synchronizing signal HSYNC, a dummy signal is output first for a short while. Next, a signal of an effective pixel region is output, and n sensor chip signals are sequentially output in the order of Chip 1, Chip 2, ..., and Chip N. In this embodiment, N is the number of up to 16. Further, each chip has 468 pixels, and therefore, the effective pixel signal comprised of 468×16=7488 pixels is output. Then, an OB (optically black) pixel signal is output on a four-pixel basis in the order of Chip 1 (OB), Chip 2 (OB), ..., and Chip N (OB). Thereafter, a dummy signal is output again.

By conducting the sorting, respective signal systems (R1, G1 and B1) of R, G and B that are lights with different wavelength regions are output. Thus, the signals alternately output in the order of R, G and B (refer to FIG. 5) are arranged in the order for obtaining a picture image. Further, as to the OB signal as well, outputs of the respective chips are sorted to be collected, whereby an appropriate clamp period can be secured, and variation of time reference signals accompanied with thermal variation between each chip can be captured.

Figure 12:
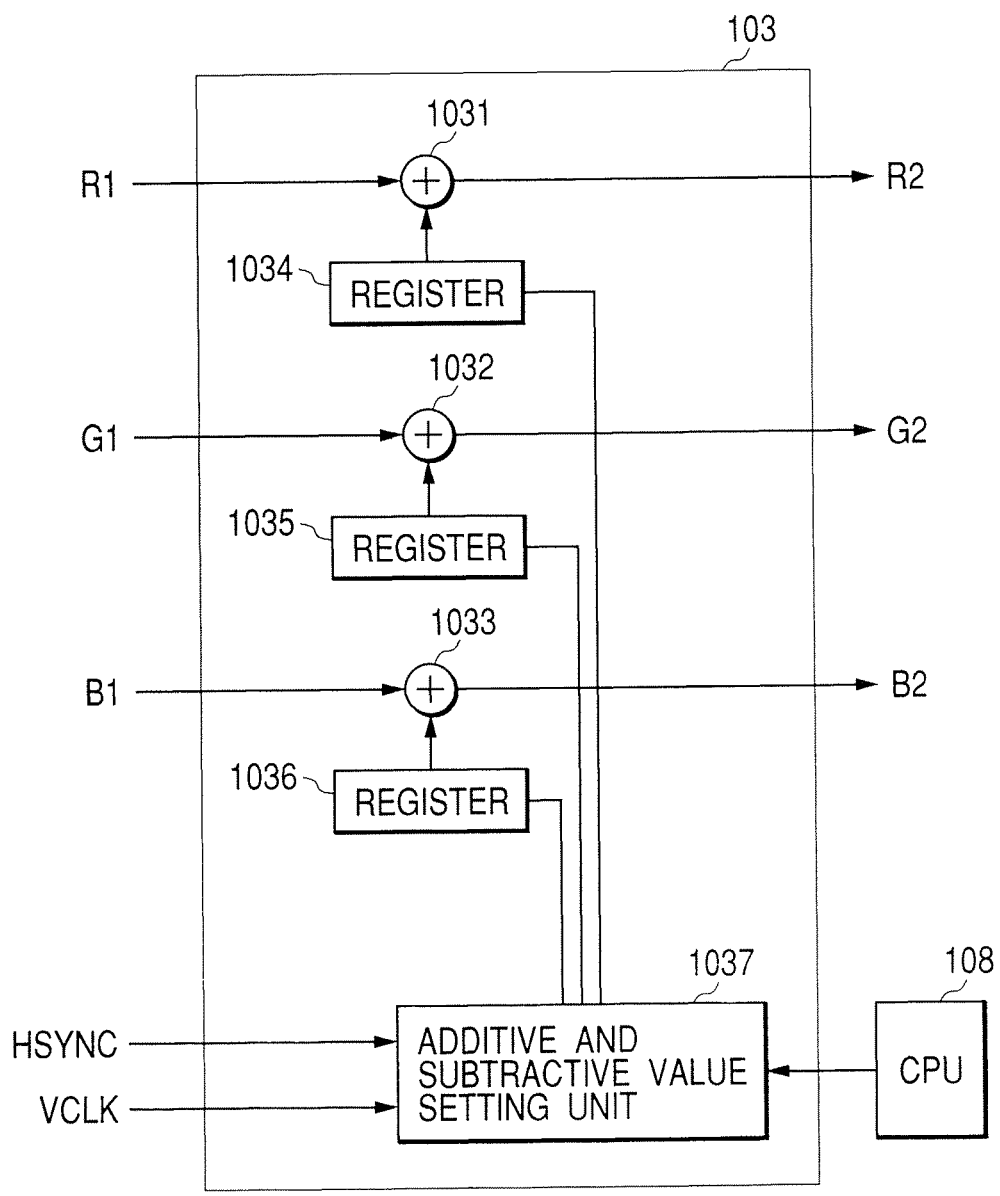
FIG. 12 is a diagram for explaining a black offset variation correction unit in accordance with the embodiment of the present invention.
Figure 13:
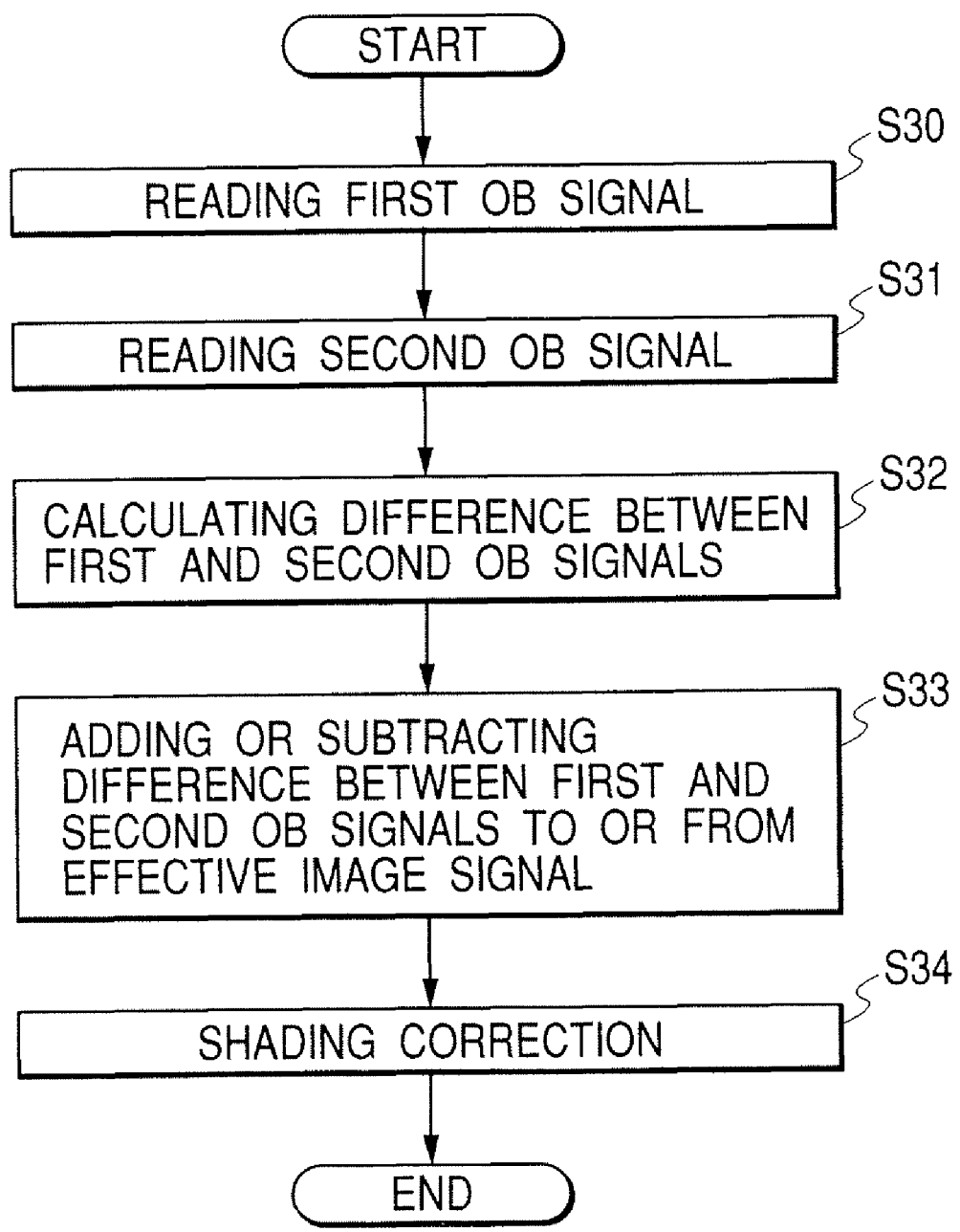
FIG. 13 is a flowchart of an offset level correction operation in accordance with the embodiment of the present invention.

FIG. 12 is a diagram for explaining a black offset variation correction unit 103. Further, FIG. 13 is a flow chart for explaining a black offset level correction operation with the use of the black offset variation correction unit 103 in this embodiment. The operations of the black offset variation correction unit 103 and the like are controlled by the control unit, CPU 108.

The following description is mainly made of the signal output from Chip 1 among 16 chips. This is because the signals output from other chips are similar to the signal output from Chip 1.

First, as described above with FIG. 10, output signals from OB pixel portions (light shielding portions) of respective chips are read out as first OB signals at the beginning of a job (for example, an image reading operation based on an operator's instruction or the like) (step S30). Next, output signals from the OB pixel portions of the respective chips are read out as second OB signals during an inter-sheet period in reading in a continuous-supply with the use of the ADF (step S31). This is controlled to be conducted with the use of a black offset amount monitoring unit 106 such that the shading correction unit 104 and the black offset variation correction unit 103 are left through, that is, signal correction is not conducted in the shading correction unit 104 and the black offset variation correction unit 103. Note that in the case where the signals before the shading correction unit 104 are monitored in the black offset amount monitoring unit 106, the through process described above may not be required.

Here, the black offset amount monitoring unit 106 has a function of holding an additional average value as described later. That is, the data is accessed through the controller CPU 108, and the operation of the equation 3 is conducted (step S32).

$$\text{Chip 1}(OB(0)) - \text{Chip 1}(OB(k)) = \text{Chip 1}(D) \quad \text{(equation 3)}$$

Chip 1 (OB (0)) in the equation 3 indicates OB pixel data of Chip 1 at the time of start of a job, and Chip 1 (OB (k)) indicates OB pixel data of Chip 1 which is sampled in an inter-sheet period (period between reading of one original and reading of another original in case of a plurality of originals) in the midway of the job. A variable k corresponds to the number of inter-sheet periods. Further, Chip 1 (D) indicates a difference between Chip 1 (OB (0)) and Chip 1 (OB (k)). Note that, as described above, as to the output signals of other chips as well, data for offset level correction is obtained as Chip 2 (D), Chip 3 (D), ..., Chip N (DN). The correction value as the data for correction is written into an additive and subtractive value setting unit 1037 by the controller 108.

The above setting is conducted during the inter-sheet period. This is because there exists a short period between reading of one sheet as an object and reading of another sheet, and this period is utilized. Therefore, the structure is adopted in which the above setting is performed in the inter-sheet period, in this embodiment. However, the present invention is not limited to this. The above setting may be conducted depending on a predetermined period. Incidentally, there may develop an influence on an image reading speed in this case.

Then, when the next original 204-2 is supplied by the ADF 203, the additive and subtractive value setting unit 1037 corrects variation of the black offset level in accordance with the signal HSYNC and the signal VCLK while reading the original. The correction values corresponding to the respective chips in the effective pixel shown in FIG. 11 are loaded to respective registers 1034, 1035 and 1036 of RGB in accordance with the timing chart shown in FIG. 9, and then, the black offset level variation is corrected by using adders 1031, 1032 and 1033 (step S33). In the black offset variation correction circuit 103, the black offset level variation of the effective pixel signal is sequentially corrected in accordance with the above difference (Chip N (D)). Thus, the shading correction to the black offset level in the initial state of the job is conducted for each chip in the shading correction unit 104 (because OB is arranged to each chip) (step S34).

In this way, also in the case where reflection images from the originals 204-2 (several tens of sheets) are read for several minutes, the variation of the black offset level is suppressed, and the reference signal level in the initial state of the job, that is, the reference signal level immediately after the initial shading correction, by which the deviation of the reference signal level per line of the sensor is cancelled, can be maintained.

This is effective particularly for the case of using a sensor such as a multi-chip sensor, which comprises a plurality of chips and in which signals are output per channel. This is because, in this case, the offset level variation with time appears differently among chips, and thus, the reference level of the effective pixel differs between channels, with the result that the difference in reference level appears as streaks on a reading image. In accordance with this embodiment of the present invention, such the streaks of the reading image can be efficiently reduced. In addition, productivity of image output (image input) is maintained.

In other words, there can be solved a problem in that the black level gradually varies, which is more conspicuous in the CIS than the reduction optical system. That is, firstly, the absolute level variation of the black level in the image can be effectively suppressed. Secondly, even in the case where the variation amount of the black level is nonuniform between a plurality of chips, there can be solved a problem in that luminance variation is generated between image regions corresponding to the plurality of chips, which leads to remarkable deterioration of the image in terms of visual quality.

This is particularly effective in the case where the signals output from the plural channels of the sensor in the CIS are sorted.

Further, the CIS module 202 includes the three line sensors of RGB, but one line sensor constituted by a plurality of chips is also an effective technique as one described in this embodiment.

The reason the offset variation correction of analog signals is conducted in the analog processor 101 is as follows. That is, as described above, the analog processor itself generates heat, and therefore, there occurs the offset level variation with time in the analog processor. This may be much more conspicuous in the case of a plurality of channels, as in this embodiment, because a signal amount is large in that case.

Figure 14:
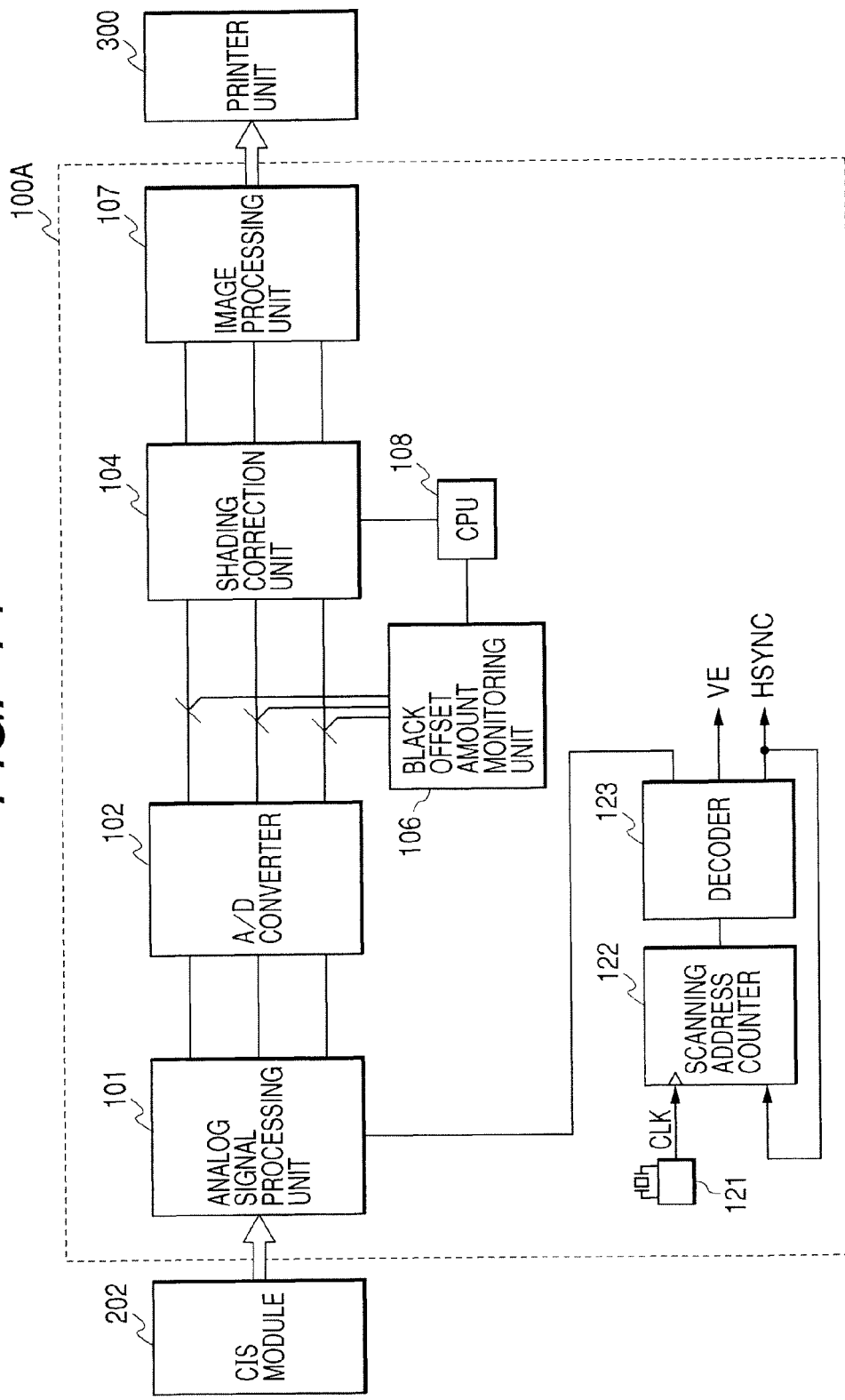
FIG. 14 is a diagram showing an image processing unit 100A in accordance with the embodiment of the present invention.

Note that the image processing unit 100 shown in FIG. 7 is adopted in this embodiment, but the present invention is not limited to this. For example, an image processing unit 100A shown in FIG. 14 may be adopted. The embodiment with this structure is described below. In FIG. 14, blocks, which are the same as those shown in FIG. 7, are denoted by the same reference numerals, and description thereof is omitted.

In the image processing unit 100A shown in FIG. 14, prior to a signal input to the shading correction unit 104, the OB signals of the respective channels are detected by the black offset amount monitoring unit 106, and the shading correction is conducted in accordance with the detected OB signals. In other words, the CPU 108 effects control such that the signals from the CIS module 202 which are stored in the line memory A and the line memory B that are storage units are corrected in accordance with the Bk (i) signals as the OB signals of the respective channels which are output from the OB portions that are the light shielding portions, and then, the IN (i) signals as the effective signals of the respective channels are corrected to output the OUT (i) signals.

Figure 15:
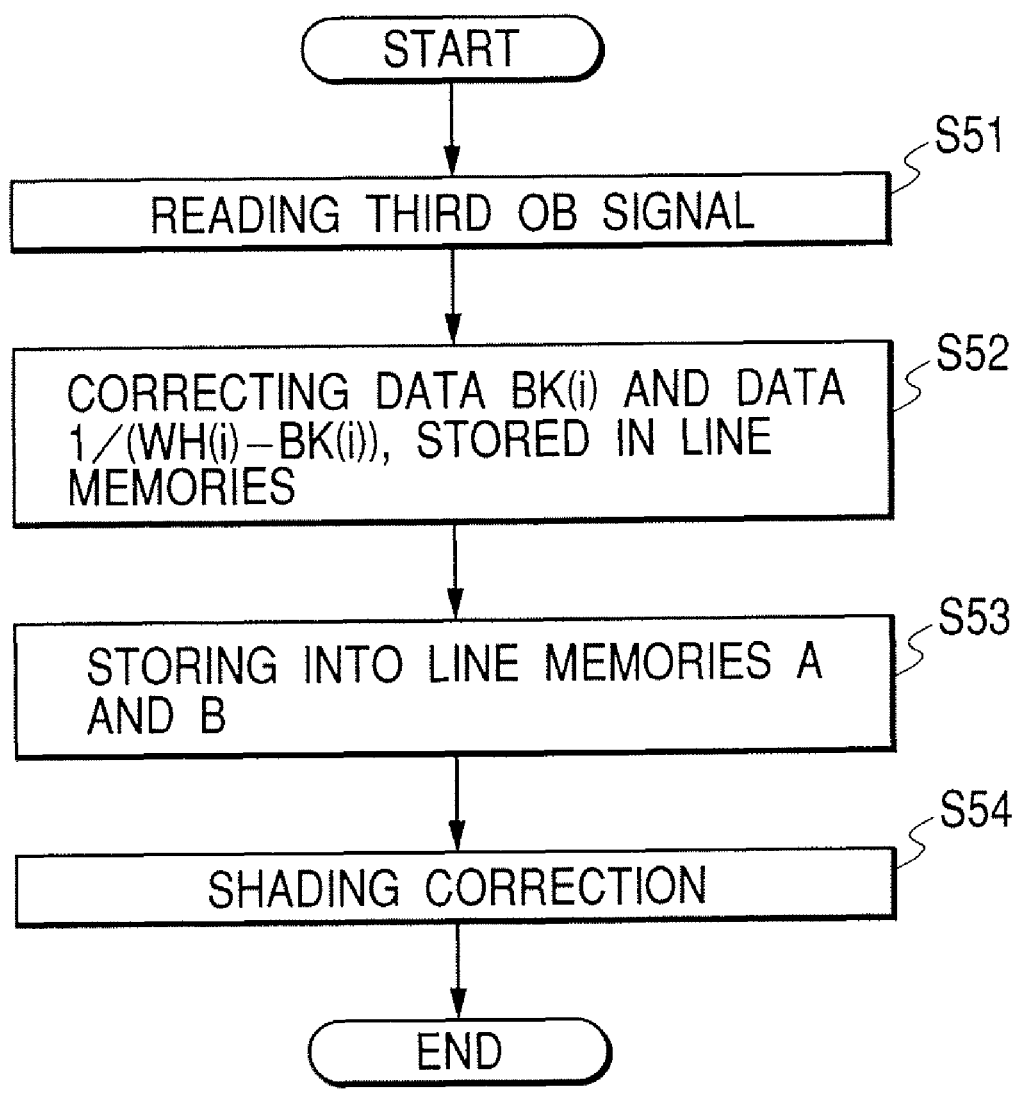
FIG. 15 is a flowchart of an operation with the image processing unit 100A in accordance with the embodiment of the present invention.

Next, an operational flow in the case of using the image processing unit 100A of FIG. 14 will be described with reference to FIG. 15. Note that the operational flow is controlled by the CPU 108 as the controller. Note that data is stored in the line memory A and the line memory B, respectively, in accordance with the above-described operational flow shown in FIG. 10. The subsequent operation is provided in accordance with the operational flow shown in FIG. 15. Further, the operational flow in the figure is written with respect to a channel 1, but the outputs from the other channels may be described with the same operational flow.

First, OB signals of respective channels are detected and read out as third OB signals by the black offset amount monitoring unit 106 (step S51). The data Bk (i) and the data 1/(WH (i)−Bk (i)) stored for each channel in the line memory A and the line memory B are subjected to additive and subtractive correction in accordance with the third OB signal (step S52). The operation result is stored for each channel in the line memories A and B (step S53). In the subsequent image reading, the above shading correction is conducted on the effective image signal by using the data stored in the line memories A and B (step S54).

As described above, for example, the image processing unit 100A shown in FIG. 14 may be adopted for this embodiment instead of the image processing unit 100 shown in FIG. 7. Note that in the case where the image processing unit 100A shown in FIG. 14 is adopted, the output signals, which are provided in the state in which the CIS module 202 is shielded against light, and are stored in the shading correction unit 104, have to be corrected based on the detection result of the black offset amount monitoring unit 106. Thus, the image processing unit 100A shown in FIG. 14 is required to have a data storage capacity larger than that of the image processing unit 100 shown in FIG. 7.

Second Embodiment

There will be described in detail one embodiment in which the image reading apparatus according to the present invention is applied to a sheet feeding apparatus with reference to FIG. 16.

Figure 16:
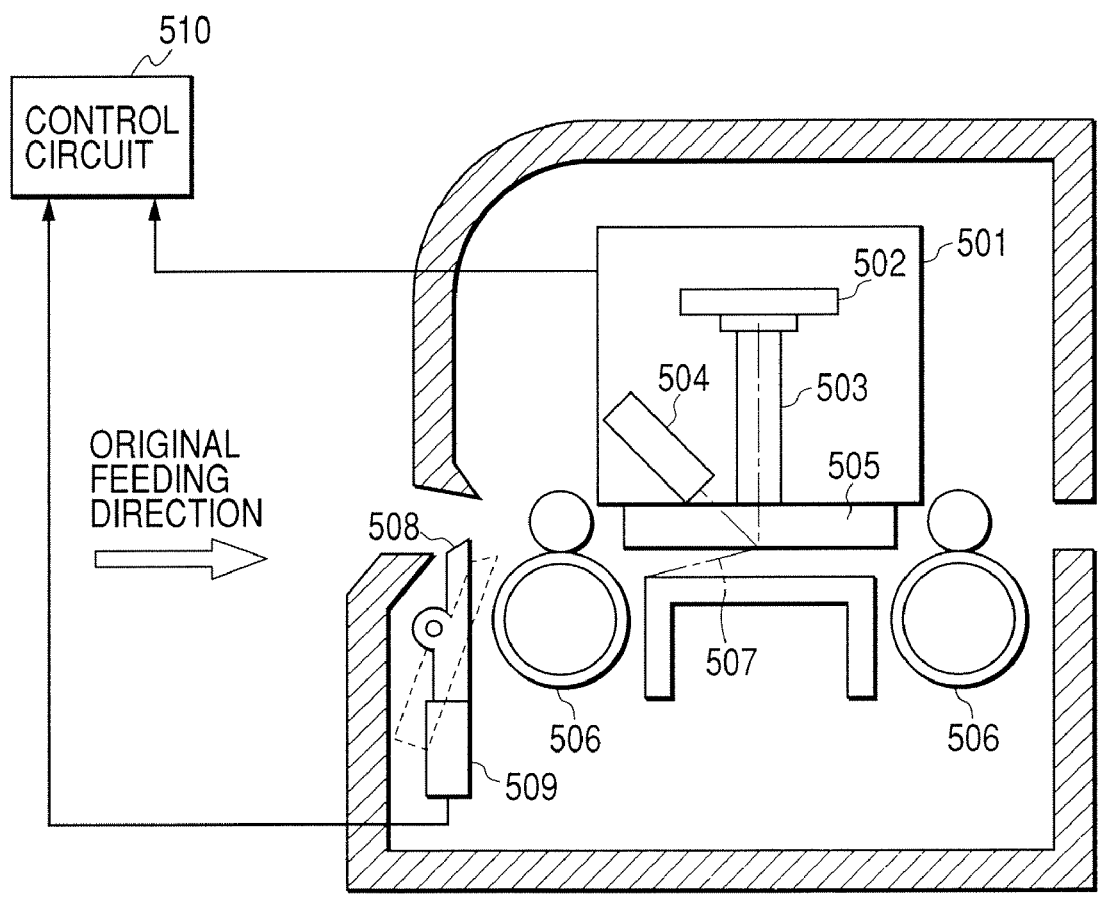
FIG. 16 is a diagram showing a sheet feeding apparatus in accordance with the embodiment of the present invention.

FIG. 16 is a schematic diagram of an original image reading apparatus for reading an original image in this embodiment.

Reference numeral 501 denotes a close-contact type image sensor (hereinafter also referred to as CIS), which is constituted by a solid-state image pickup element 502, a SELFOC lens 503, an LED array 504 and a contact glass 505.

Conveying rollers 506 are arranged in front of and behind the CIS 501, and are used to arrange an original. A contact sheet 507 is used to make the original in contact with the CIS 501. Reference numeral 510 denotes a control circuit, which conducts processing of signals from the CIS 501 and has the same control function as the control unit 108 in the first embodiment.

An original detection lever 508 is a lever for detecting that an original is inserted. When the original detection lever 508 detects that an original is inserted, it tilts, the output of an original detection sensor 509 then varies, and this state is transmitted to the CPU in the control circuit 510. From this, it is judged that the original is inserted. Then, the original conveyance is started by driving a motor (not shown) for driving the original conveying roller 506, thereby performing a reading operation.

The same effect as in the first embodiment can be obtained with the above structure.

As described above, according to the present invention, the variation of the time reference signal accompanied with thermal variation is efficiently suppressed, thereby being capable of conducting satisfactory image reading.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart in FIG. 3, 4 or 5 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image reading apparatus comprising:
an imaging unit comprised of a plurality of chips linearly mounted on a substrate, each chip including a light receiving portion that receives light from an object and that outputs a plurality of first signals, and a light-shielded portion, in which light from the object is shielded, that outputs a plurality of second signals;
a light source arranged to illuminate the object;
a sorting unit constructed to sort the plurality of first signals and the plurality of second signals from the imaging unit on an each chip basis;
a signal correction unit constructed to correct, on the each chip basis, one of the plurality of first signals output from the imaging unit when the light source illuminates the object, in accordance with one of the plurality of second signals output from the imaging unit when the light source does not illuminate the object, and in accordance with one of the plurality of second signals output from the imaging unit when the light source illuminates the object,
wherein the signal correction unit corrects the plurality of first signals sorted by the sorting unit in accordance with the plurality of second signals sorted by the sorting unit.

2. An image reading apparatus according to claim 1, further comprising:
a storage unit constructed to store the one of the plurality of second signals that is output from the imaging unit when the light source does not illuminate the object and that is sorted by the sorting unit;
wherein the signal correction unit corrects the plurality of first signals from the sorting unit in accordance with the one of the plurality of second signals from the storage unit and the one of the plurality of second signals from the sorting unit.

3. An image reading apparatus according to claim 1, wherein the signal correction unit corrects an offset level of the plurality of first signals.

4. An image reading apparatus according to claim 1, further comprising a moving unit constructed to move the imaging unit and an original which is the object, relative to each other,
wherein the imaging unit reads an image of the original, and in the case of a plurality of originals, the controller effects control so as to correct the plurality of first signals in accordance with the plurality of second signals output from the imaging unit during an inter-sheet period of the original images.

5. An image reading apparatus according to claim 1, further comprising a conversion unit constructed to convert an analog signal output from the imaging unit into a digital signal,
wherein the signal correction unit corrects the signal converted by the conversion unit.

6. An image reading apparatus according to claim 1, wherein the imaging unit sequentially and alternately outputs signals of different colors, and
wherein the signals of different colors are sorted on a color-by-color basis.

7. An image reading apparatus comprising:
an imaging unit comprised of a light receiving portion that receives light from an object and that outputs a plurality of first signals, and a light-shielded portion, in which light from the object is shielded, that outputs a plurality of second signals, the light receiving portion sequentially and alternately outputting the plurality of first signals of different colors;
a light source arranged to illuminate the object;
a sorting unit constructed to sort the plurality of first signals of different colors on a color-by-color basis;
a signal correction unit constructed to correct the plurality of first signals output from the imaging unit when the light source illuminates the object, in accordance with one of the plurality of second signals output from the imaging unit when the light source does not illuminate the object, and in accordance with one of the plurality of second signals output from the imaging unit when the light source illuminates the object,
wherein the signal correction unit corrects the plurality of first signals sorted by the sorting unit in accordance with the plurality of second signals.

8. An image reading apparatus according to claim 7, further comprising a storage unit constructed to store the one of the plurality of second signals that is output from the imaging unit when the light source does not illuminate the object and that is sorted by the sorting unit,
wherein the signal correction unit corrects the plurality of first signals from the sorting unit in accordance with the one of the plurality of second signals from the storage unit and the one of the plurality of second signals from the imaging unit.

9. An image reading apparatus according to claim 7, wherein the signal correction unit corrects an offset level of the plurality of first signals.

10. An image reading apparatus according to claim 7, further comprising a moving unit constructed to move the imaging unit and an original which is the object, relative to each other,
wherein the imaging unit reads an image of the original, and in the case of a plurality of originals, the controller effects control so as to correct the plurality of first signals in accordance with the plurality of second signals output from the imaging unit during an inter-sheet period of the original images.

* * * * *